US012662945B2

(12) United States Patent
Propheter-Hinckley et al.

(10) Patent No.: US 12,662,945 B2
(45) Date of Patent: Jun. 23, 2026

(54) COMBUSTOR-VANE INTERFACE FEATHER SEAL

(71) Applicant: United Technologies Corporation, Farmington, CT (US)

(72) Inventors: Tracy A. Propheter-Hinckley, Rocky Hill, CT (US); Steven D. Porter, Wethersfield, CT (US); Caroline Karanian, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 1937 days.

(21) Appl. No.: 16/195,925

(22) Filed: Nov. 20, 2018

(65) Prior Publication Data

US 2020/0157959 A1 May 21, 2020

(51) Int. Cl.
*F01D 9/02* (2006.01)
*F01D 11/00* (2006.01)
*F23R 3/00* (2006.01)

(52) U.S. Cl.
CPC ............ *F01D 11/008* (2013.01); *F01D 9/023* (2013.01); *F23R 3/002* (2013.01); *F05D 2240/56* (2013.01); *F23R 2900/00012* (2013.01)

(58) Field of Classification Search
CPC ...... F01D 11/008; F01D 11/005; F01D 9/023; F01D 25/24; F01D 25/243; F01D 25/28; F01D 25/30; F23R 3/002; F23R 3/60; F23R 2500/00012; F23R 2900/00012; F05D 2240/56
See application file for complete search history.

(56) References Cited

U.S. PATENT DOCUMENTS 4,273,824 A * 6/1981 McComas ............... F01D 5/284 442/7
4,465,284 A 8/1984 Szema
4,688,310 A * 8/1987 Kelm ..................... B21D 35/00 29/889.22

(Continued)

FOREIGN PATENT DOCUMENTS

| | | |
|---|---|---|
| EP | 2660428 | 11/2013 |
| EP | 3372792 | 9/2018 |
| WO | 0012870 | 3/2000 |

OTHER PUBLICATIONS

The Extended European Search Report for European Patent Application No. 19210456.0 dated Apr. 14, 2020.

*Primary Examiner* — Courtney D Heinle
*Assistant Examiner* — Danielle M. Christensen
(74) *Attorney, Agent, or Firm* — Carlson, Gaskey & Olds, P.C.

(57) ABSTRACT

A gas turbine engine includes a combustor disposed about an engine central axis and a circumferential row of vanes adjacent an exit region of the combustor. The combustor includes a combustor wall and a combustion chamber. The combustor wall has a lip at the exit region. Each vane includes a platform and an airfoil section extending from the platform. The forward edges of the platforms are adjacent the lip of the combustor wall. The lip defines a first annular slot and the forward edges of the vanes collectively define a second annular slot. The first and second annular slots together define an annular seal slot. An annular feather seal is entrapped in the annular seal slot between the combustor wall and the platform.

20 Claims, 4 Drawing Sheets

(56) References Cited

U.S. PATENT DOCUMENTS

| | | | | |
|---|---|---|---|---|
| 5,924,699 | A * | 7/1999 | Airey | F01D 11/008 277/411 |
| 6,254,333 | B1 * | 7/2001 | Merry | F01D 11/005 415/115 |
| 7,784,264 | B2 | 8/2010 | Weaver et al. | |
| 8,092,159 | B2 | 1/2012 | Maldonado | |
| 8,661,828 | B2 * | 3/2014 | Pieussergues | F16J 15/0887 60/752 |
| 9,010,122 | B2 | 4/2015 | Bangerter et al. | |
| 9,816,393 | B2 * | 11/2017 | Simon-Delgado | F01D 11/005 |
| 10,041,416 | B2 | 8/2018 | Low et al. | |
| 10,458,264 | B2 * | 10/2019 | Mongillo, Jr. | F01D 25/246 |
| 2002/0121744 | A1 | 9/2002 | Aksit et al. | |
| 2002/0184889 | A1 * | 12/2002 | Calvez | F23R 3/06 60/796 |
| 2006/0082074 | A1 * | 4/2006 | Synnott | F16J 15/0887 277/641 |
| 2014/0023487 | A1 * | 1/2014 | Dougan | F01D 25/243 415/144 |
| 2016/0131041 | A1 * | 5/2016 | Wassynger | F01D 9/023 60/796 |
| 2016/0222812 | A1 * | 8/2016 | Sippel | F01D 11/08 |
| 2018/0016927 | A1 * | 1/2018 | Corsmeier | F23R 3/60 |

* cited by examiner

COMBUSTOR-VANE INTERFACE FEATHER SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

A gas turbine engine according to an example of the present disclosure includes a combustor that has a combustor wall and a combustion chamber. The combustor wall has a lip at an exit region of the combustion chamber. There is a circumferential row of vanes adjacent the exit region. Each vane includes a platform and an airfoil section extending from the platform. The platform defines forward and trailing edges and first and second circumferential side edges joining the forward and trailing edges. The forward edge is adjacent the lip of the combustor wall. The lip defines a first annular slot and the forward edges collectively defining a second annular slot. The first and second annular slots together define an annular seal slot. An annular feather seal is entrapped in the annular seal slot between the combustor wall and the platform.

In a further embodiment of any of the foregoing embodiments, the platform is radially inwards of the airfoil section.

In a further embodiment of any of the foregoing embodiments, the lip of the combustor abuts the leading edge of the platform.

In a further embodiment of any of the foregoing embodiments, the annular feather seal is a split ring.

In a further embodiment of any of the foregoing embodiments, the split ring has overlapping ends.

In a further embodiment of any of the foregoing embodiments, the first annular slot is defined by radially inner and outer walls of the combustor wall and the second annular slot is defined by radially inner and outer walls of the platform.

In a further embodiment of any of the foregoing embodiments, the radially outer wall of the first annular slot and the radially outer wall of the second annular slot abut, and the radially inner wall of the first annular slot and the radially inner wall of the second slot are axially spaced apart such that there is a gap there between.

In a further embodiment of any of the foregoing embodiments, at least one of the radially inner wall of the first annular slot or the radially inner wall of the second annular slot is scalloped.

In a further embodiment of any of the foregoing embodiments, the seal slot is radially thicker than the annular feather seal.

A gas turbine engine according to an example of the present disclosure includes a combustor that has a combustor wall and a combustion chamber. The combustor wall has a lip at an exit region of the combustion chamber. There is a vane adjacent the exit region that has a platform and an airfoil section extending along a radial axis from the platform. The platform defines forward and trailing edges and first and second circumferential side edges joining the forward and trailing edges. The vane has rotational play about the radial axis under aerodynamic loads such that the vane moves relative to the combustor between a seated state in which the forward edge abuts the lip of the combustor wall and an unseated state in which there is a divergent gap between the forward edge and the lip of the combustor. The lip defines a first slot that extends circumferentially and the forward edge defines a second slot that extends circumferentially. The first and second slots together define a seal slot. An annular feather seal extends in the seal slot. The annular feather seal is wider than the divergent gap to maintain sealing when in the vane is in the unseated state.

In a further embodiment of any of the foregoing embodiments, the first side of the airfoil section is a suction side, the second side of the airfoil section is a pressure side, the second circumferential side of the platform is located to the second side of the airfoil section, and the divergent gap diverges toward the second circumferential side.

In a further embodiment of any of the foregoing embodiments, the annular feather seal is a split ring.

In a further embodiment of any of the foregoing embodiments, the split ring has overlapping ends.

In a further embodiment of any of the foregoing embodiments, the first slot is defined by first radially inner and outer walls of the combustor wall and the second slot is defined by radially inner and outer walls of the platform.

In a further embodiment of any of the foregoing embodiments, at least one of the radially inner wall of the first annular slot or the radially inner wall of the second annular slot is scalloped.

In a further embodiment of any of the foregoing embodiments, the seal slot is radially thicker than the annular feather seal.

An airfoil according to an example of the present disclosure includes a vane that has a platform and an airfoil section that extends from the platform. The platform defines forward and trailing edges and first and second circumferential side edges that join the forward and trailing edges. The forward edge includes a bearing surface for abutting a lip of a combustor wall. The forward edge defines a slot arc segment for receiving a portion of an annular feather seal.

In a further embodiment of any of the foregoing embodiments, the platform is radially inwards of the airfoil section.

In a further embodiment of any of the foregoing embodiments, the slot arc segment is defined by radially inner and outer walls, and the radially inner wall is scalloped.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
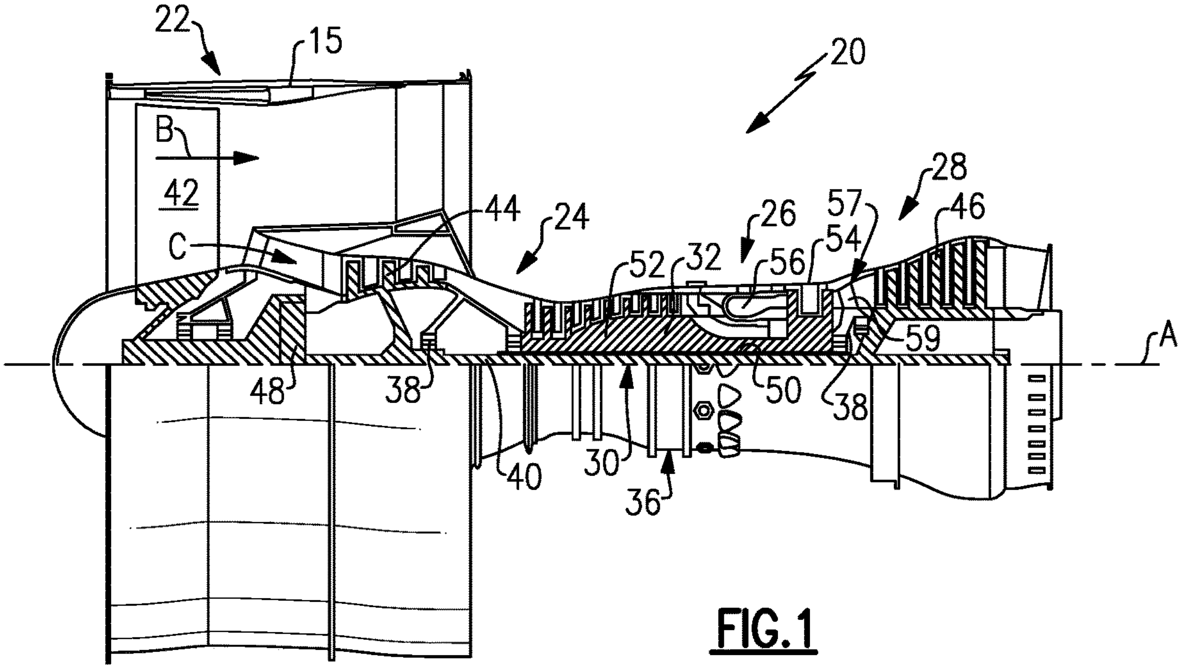
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]^0.5. The "Low corrected fan tip speed" as disclosed herein according to one non-limiting embodiment is less than about 1150 ft/second (350.5 meters/second).

Figure 2:
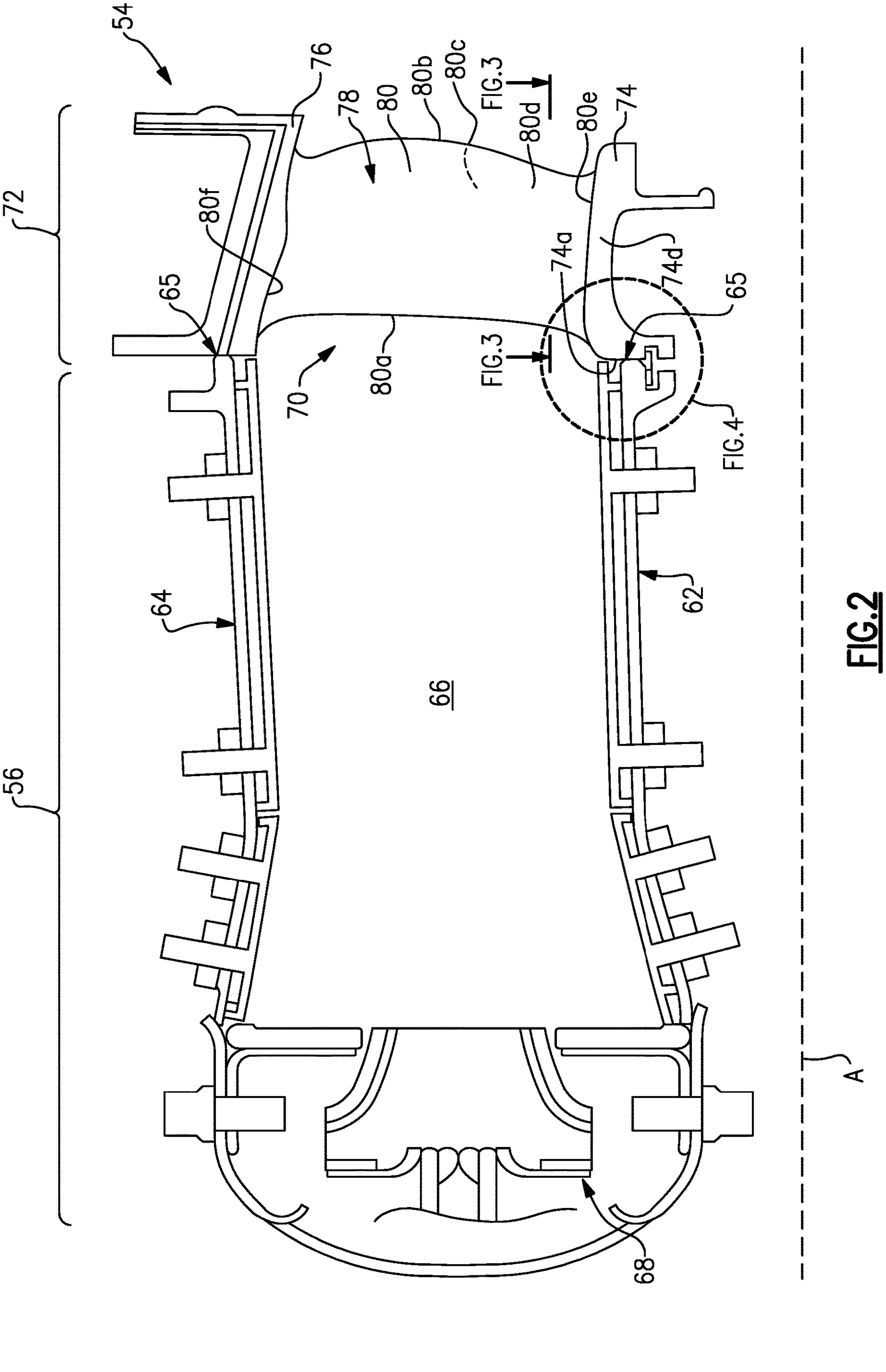
FIG. 2 illustrates portions of the combustor and turbine section of the engine of FIG. 1.

FIG. 2 illustrates a view taken through selected portions of the combustor 56 and high pressure turbine 54 of the engine 20. In this example, the combustor 56 is an annular combustor that extends around the engine central axis A, although it is contemplated that the examples herein are also applicable to can type combustors. The combustor 56 includes a radially inner shell or combustor wall 62 and a radially outer shell or combustor wall 64. The walls 62/64 define an annular combustor chamber 66 there between. The combustor 56 includes one or more injectors 68 at a forward end of the combustor 56, and an exit region 70 at the aft end of the combustor 56. The combustor walls 62/64 each include a lip 65 at the axially trailing end thereof.

Figure 3:
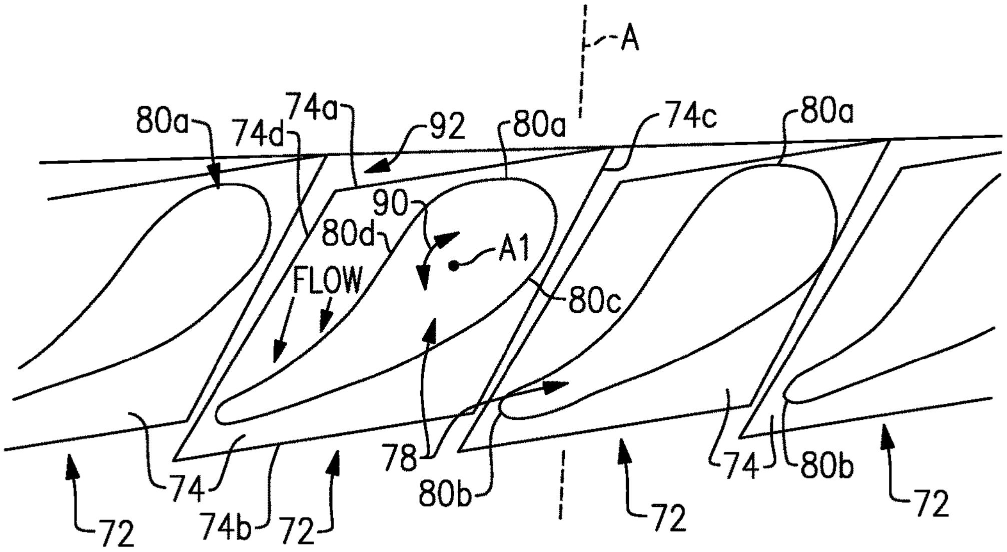
FIG. 3 illustrates a radial view of turbine vanes in the turbine section.

The high pressure turbine 54 includes a circumferential row of turbine vanes 72 adjacent the exit region 70. Each vane 72 includes an inner or first platform 74, an outer or second platform 76, and an airfoil section 78 that spans in a radial direction between the first and second platforms 74/76. A radial view of a portion of the row of turbine vanes 72 is also shown in FIG. 3. Terms such as "radially,"

"axially," "circumferentially," or variations thereof are used herein to designate directionality with respect to the engine central axis A.

The airfoil section 78 includes an airfoil outer wall 80 that delimits the profile of the airfoil section 78. The outer wall 80 defines a leading end 80*a*, a trailing end 80*b*, and first and second sides 80*c*/80*d* that join the leading and trailing ends 80*a*/80*b*. The first and second sides 80*c*/80*d* span in the radial direction between first and second ends 80*e*/80*f* that are attached, respectively, to the first and second platforms 74/76. In this example, the first side 80*c* is a suction side and the second side 80*d* is a pressure side.

The first platform 74 (FIG. 3) defines forward and trailing edges 74*a*/74*b* and first and second circumferential side edges 74*c*/74*d* that join the forward and trailing edges 74*a*/74*b*. Generally, the first and second circumferential side edges 74*c*/74*d* mate with or bear against the respective second and first circumferential side edges 74*c*/74*d* of the adjacent vanes 72. Likewise, the second platform 76 defines forward and trailing edges and first and second circumferential side edges that join the forward and trailing edges. The first and second circumferential side edges also mate with or bear against the respective second and first circumferential side edges of the adjacent vanes 72. The examples herein below may be directed to the first platform 74. However, it is to be understood that the examples are also applicable to the second platform 76.

Figure 4:
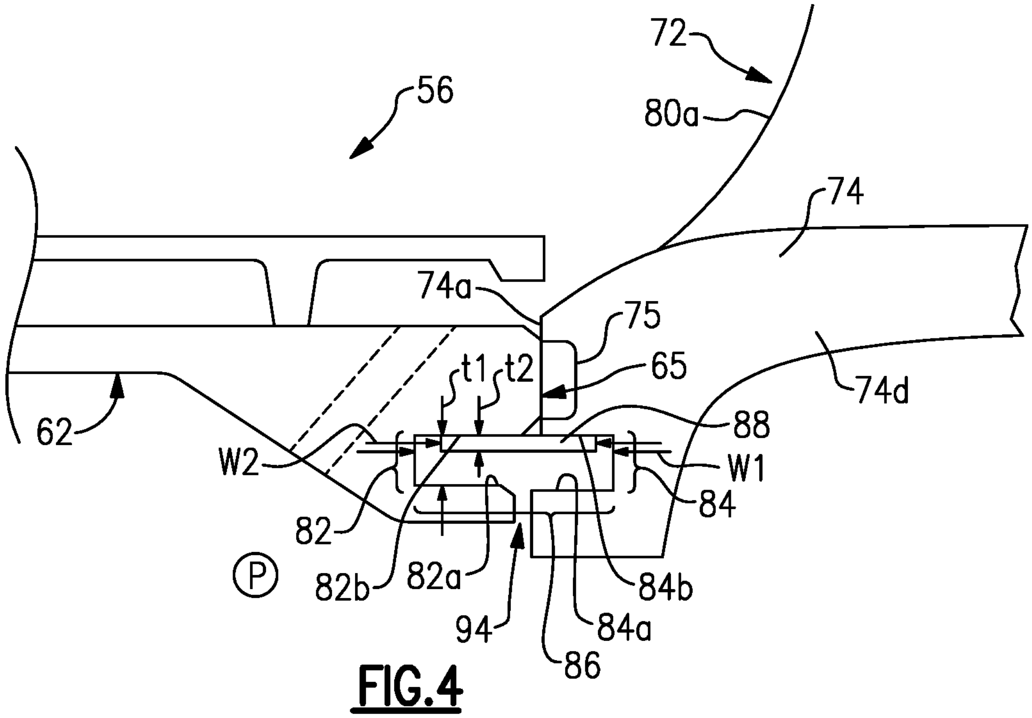
FIG. 4 illustrates a magnified view of the interface between the combustor and the turbine vanes.
Figure 5:
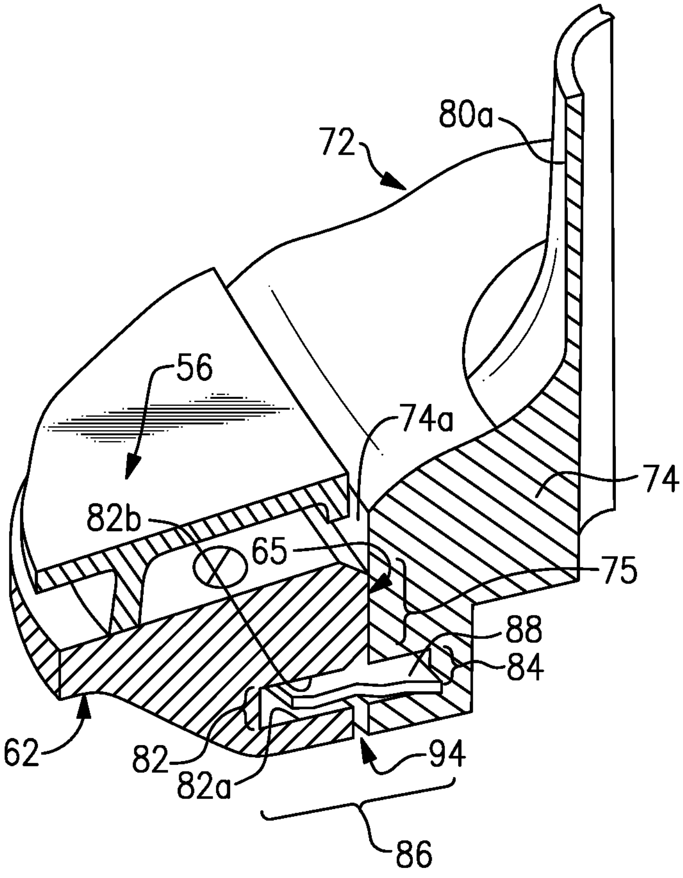
FIG. 5 illustrates a sectioned view of the interface between the combustor and the turbine vanes.

FIG. 4 illustrates a magnified view of the exit region 70 of the combustor 56 at the forward edge 74*a* of the vane 72, and FIG. 5 illustrates a sectioned view of the same area. The forward edge 74*a* is adjacent the lip 65 of the combustor wall 62. In FIGS. 4 and 5, the vane 72 is shown in a seated position. In the seated position, a bearing surface 75 on the forward edge 74*a* of the platform 74 abuts the lip 65 of the combustor wall 62. The abutment between the lip 65 and the bearing surface 75 provides a primary seal across the interface between the platform 74 and the combustor wall 62 to prevent the escape of combustion gases from the core flow path.

The lip 65 defines a first annular slot 82 and the forward edges 74*a* of the platforms 74 of the vanes 72 collectively define a second annular slot 84. The first and second annular slots 82/84 together define an annular seal slot 86. An annular feather seal 88 is entrapped in the annular seal slot 86 between the combustor wall 62 and the platform 74. As will be described further below, the platform 74 can move axially away from the lip 65, thereby opening a gap through which combustion gases can escape. In this regard, the annular feather seal 88 serves as a secondary seal across the interface between the platform 74 and the combustor wall 62 to prevent the escape of combustion gases from the core gaspath.

As shown in FIG. 3 and represented at 90, the vanes 72 have rotational play about their radial axes A1 under aerodynamic loads. For instance, although the vanes 72 are generally statically mounted, due to tolerances in manufacturing and assembly, the vanes 72 can shift somewhat from their proper design positions in which the bearing surfaces 75 are seated against the lip 65. Flow of combustion gases from the combustor 56 impinges against the second side 80*d* of the airfoil section 78, particularly toward the trailing end 80*b*, thereby generating a rotational force about the axis A1. In combination with the play in the position of the vanes 72, the rotational forces can cause the vanes 72 to rotate from their design positions. The rotation tends to shift one side of the vanes 72 in an axially aft direction, unseating the bearing surface 75 from the lip 65. In the unseated position there is thus a divergent gap 92 across the interface between the platform 74 and the combustor wall 62 through which combustion gases can escape. That is, one corner of the platform 74 at the forward edge 74*a* remains in contact with, or at least in close proximity to, the lip 65, while the opposite corner of the platform 74 at the forward edge 74*a* shifts axially aftwards.

In particular, the divergent gap 92 presents an unusual sealing challenge because the vanes 72 may dynamically move between the seated and unseated positions during engine operation and the forward edges 74*a* of the platforms 74 and the lip 65 are non-parallel when in the unseated position. Thus, seals that cannot accommodate dynamic movement or seals that rely on parallel sides may not provide a desired level of sealing. In this regard, the annular feather seal 88 is able to address both the dynamic movement and the non-parallel nature of the divergent gap 92.

For example, the configuration of the feather seal 88 and the seal slot 86 facilitate dynamic sealing of the divergent gap 92. In one example, the seal slot 86 defines a slot radial thickness t1 and the feather seal 88 defines a seal radial thickness t2, where t2 is less than t1. The seal slot 86 also defines a slot axial width w1 and the feather seal 88 defines a seal axial width w2, where w2 is less than w1. That is, the feather seal 88 is smaller in cross-section than the seal slot 86. This permits the feather seal 88 to shift dynamically within the seal slot 86 to accommodate shifts in the position of the vanes 72. Additionally, the seal axial width w2 is larger (i.e., wider) than the divergent gap 92, to maintain sealing when the vane 72 is in the unseated state. For instance, the play in the vanes 72 may be determined or estimated during engine design to determine or estimate the maximum size of the divergent gap 92. The seal axial width w2 is then selected to be larger than the maximum size in order to ensure sealing entirely along the divergent gap 92.

The first and second annular slots 82/84 that define the annular seal slot 86 are also configured to bias the feather seal 88 to a sealed position. For example, the first slot 82 is defined by radially inner and outer walls 82*a*/82*b* of the combustor wall 62, and the second slot 84 is defined by radially inner and outer walls 84*a*/84*b* of the platform 74. The outer wall 82*b* and the outer wall 84*b* abut (at bearing surface 75 and lip 65). The inner wall 82*a* and the inner wall 84*a* are axially spaced apart such that there is a gap 94 there between. There is a high pressure region "P" (FIG. 4) radially inwards of the combustor wall 62 and the platform 74. The pressure in the high pressure region is greater than the pressure in the core gaspath. The high pressure communicates through the gap 94 into the seal slot 86 to bias the feather seal 88 radially outwards, against the outer walls 82*b*/84*b*, thereby maintaining the feather seal 88 in a sealed position.

Figure 6:
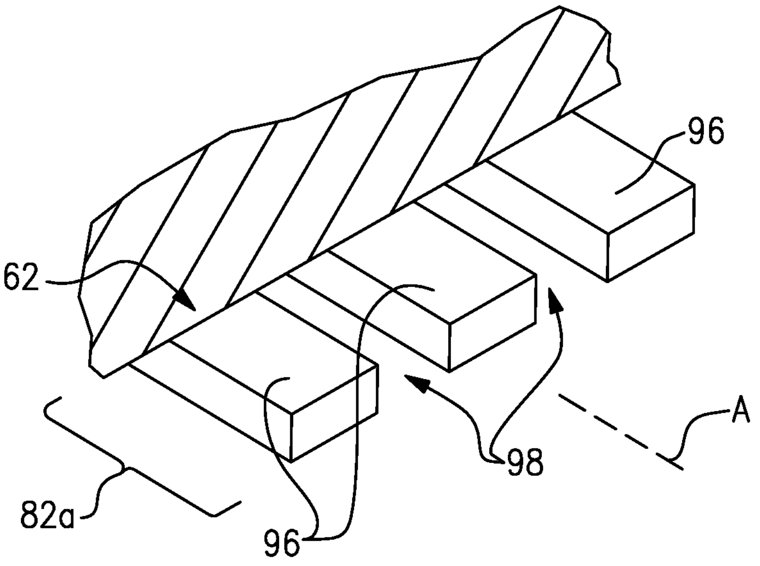
FIG. 6 illustrates a scalloped lip of the combustor.

To further permit communication of the high pressure in addition to the gap 94, and also reduce weight, at least one of the inner wall 82*a* or the inner wall 84*a* may be scalloped. FIG. 6 shows an example of the inner wall 82*a*, although it is to be understood that the example is also applicable to the inner wall 84*a*. As shown, the inner wall 82*a* includes tabs 96 and axial slots 98 that are circumferentially between the tabs 96 to provide a scalloped configuration. The axial slots 98 provide additional area for communication of the high pressure into the seal slot 86 to bias the feather seal 88 radially outwards.

Figure 7:
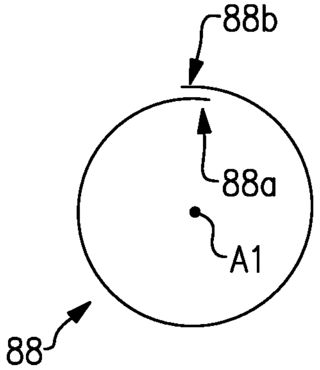
FIG. 7 illustrates an isolated view of a feather seal split ring.

The feather seal 88 is also configured to dynamically adapt in diametric size to maintain sealing. FIG. 7 shows an isolated axial view of the feather seal 88. In this example, the feather seal is a split ring. The split ring has first and second ends 88*a*/88*b* that are overlapping. The ends 88*a*/88*b* are thus free to move relative to one another. The split ring can thereby readily expand and contract in diameter. For instance, the split ring may thermally expand and contract with thermal transients in the engine 20. If constrained, as an endless ring, such expansion or contraction may cause a seal to unseat from its sealing position. However, because the ends 88*a*/88*b* can move, the feather seal 88 can readily expand and contract and thereby maintain a sealing position against the radially outer walls 82*b*/84*b* in the seal slot 86 under various thermal conditions.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:

a combustor disposed about an engine central axis and including a combustor wall and a combustion chamber, the combustor wall having a lip at an exit region of the combustion chamber;

a circumferential row of vanes adjacent the exit region, each said vane including a platform and an airfoil section extending from the platform, the platform defining forward and trailing edges and first and second circumferential side edges joining the forward and trailing edges, the forward edge being adjacent the lip of the combustor wall, the lip defining a first annular slot and the forward edges collectively defining a second annular slot, the first and second annular slots together defining an annular seal slot; and an annular feather seal entrapped in the annular seal slot between the combustor wall and the platform.

2. The gas turbine engine as recited in claim 1, wherein the platform is radially inwards of the airfoil section.

3. The gas turbine engine as recited in claim 1, wherein the lip of the combustor abuts the leading edge of the platform.

4. The gas turbine engine as recited in claim 1, wherein the annular feather seal is a split ring.

5. The gas turbine engine as recited in claim 4, wherein the split ring has overlapping ends.

6. The gas turbine engine as recited in claim 1, wherein the first annular slot is defined by radially inner and outer walls of the combustor wall and the second annular slot is defined by radially inner and outer walls of the platform.

7. The gas turbine engine as recited in claim 6, wherein the radially outer wall of the first annular slot and the radially outer wall of the second annular slot abut, and the radially inner wall of the first annular slot and the radially inner wall of the second slot are axially spaced apart such that there is a gap there between.

8. The gas turbine engine as recited in claim 6, wherein at least one of the radially inner wall of the first annular slot or the radially inner wall of the second annular slot is scalloped.

9. The gas turbine engine as recited in claim 1, wherein the seal slot is radially thicker than the annular feather seal.

10. A gas turbine engine comprising:

a combustor disposed about an engine central axis and including a combustor wall and a combustion chamber, the combustor wall having a lip at an exit region of the combustion chamber;

a vane adjacent the exit region, the vane including a platform and an airfoil section extending along a radial axis from the platform, the platform defining forward and trailing edges and first and second circumferential side edges joining the forward and trailing edges, the vane having rotational play about the radial axis under aerodynamic loads such that the vane moves relative to the combustor between a seated state in which the forward edge abuts the lip of the combustor wall and an unseated state in which there is a divergent gap between the forward edge and the lip of the combustor, the lip defining a first slot extending circumferentially and the forward edge defining a second slot extending circumferentially, the first and second slots together defining a seal slot; and an annular feather seal extending in the seal slot, the annular feather seal being wider than the divergent gap to maintain sealing when the vane is in the unseated state.

11. The gas turbine engine as recited in claim 10, wherein the first side of the airfoil section is a suction side, the second side of the airfoil section is a pressure side, the second circumferential side of the platform is located to the second side of the airfoil section, and the divergent gap diverges toward the second circumferential side.

12. The gas turbine engine as recited in claim 10, wherein the annular feather seal is a split ring.

13. The gas turbine engine as recited in claim 12, wherein the split ring has overlapping ends.

14. The gas turbine engine as recited in claim 10, wherein the first slot is defined by first radially inner and outer walls of the combustor wall and the second slot is defined by radially inner and outer walls of the platform.

15. The gas turbine engine as recited in claim 14, wherein at least one of the radially inner wall of the first annular slot or the radially inner wall of the second annular slot is scalloped.

16. The gas turbine engine as recited in claim 14, wherein the radially outer wall of the first annular slot and the radially outer wall of the second annular slot abut, and the radially inner wall of the first annular slot and the radially inner wall of the second slot are axially spaced apart such that there is a gap there between.

17. The gas turbine engine as recited in claim 10, wherein the seal slot is radially thicker than the annular feather seal.

18. An airfoil comprising:

a vane including a platform and an airfoil section extending from the platform, the platform defining forward and trailing edges and first and second circumferential side edges joining the forward and trailing edges, the forward edge including a bearing surface for abutting a lip of a combustor wall to provide a seal across an interface between the platform and the combustor wall, and the forward edge defining a slot arc segment for receiving a portion of an annular feather seal.

19. The airfoil as recited in claim 18, wherein the platform is radially inwards of the airfoil section.

20. The airfoil as recited in claim 18, wherein the slot arc segment is defined by radially inner and outer walls, and the radially inner wall is scalloped.

* * * * *